(12) United States Patent
Sui et al.

(10) Patent No.: US 8,957,627 B1
(45) Date of Patent: Feb. 17, 2015

(54) BATTERY CHARGING VIA HIGH SPEED DATA INTERFACE

(75) Inventors: Haijian Sui, Beijing (CN); Kewei Yang, Saratoga, CA (US); Ning Zhu, San Jose, CA (US); Soumendra Mohanty, San Jose, CA (US)

(73) Assignee: Analogix Semiconductor, Inc., Santa Clara, CA (US)

( * ) Notice: Subject to any disclaimer, the term of this patent is extended or adjusted under 35 U.S.C. 154(b) by 430 days.

(21) Appl. No.: 13/444,719

(22) Filed: Apr. 11, 2012

Related U.S. Application Data

(60) Provisional application No. 61/474,193, filed on Apr. 11, 2011.

(51) Int. Cl.
   *H01M 10/44* (2006.01)
(52) U.S. Cl.
   USPC .......................................... 320/107

(58) Field of Classification Search
   USPC .................. 320/107, 125, 128, 155, 160
   See application file for complete search history.

(56) References Cited

U.S. PATENT DOCUMENTS

| | | | |
|---|---|---|---|
| 7,058,484 B1 * | 6/2006 | Potega ........................... | 700/297 |
| 7,062,250 B1 * | 6/2006 | Kosaka ........................ | 455/343.5 |
| 2011/0248665 A1 * | 10/2011 | Smith et al. ................... | 320/101 |

\* cited by examiner

*Primary Examiner* — Edward Tso
(74) *Attorney, Agent, or Firm* — Carr & Ferrell LLP

(57) ABSTRACT

Systems and methods for charging a mobile device using a high-speed data interface are described. Power may be provided from Transition Minimized Differential Signaling (TMDS) lines when TMDS data is transmitted via a High-Definition Multimedia Interface (HDMI) connection between a transmitter, such as a mobile device, and a receiving device. Power may be provided to the mobile device in exemplary embodiments such that when the transmitter is in idle or power down state, power may be provided from TMDS lines as part of an upstream charging function.

19 Claims, 4 Drawing Sheets

BATTERY CHARGING VIA HIGH SPEED DATA INTERFACE

CROSS-REFERENCE TO RELATED APPLICATIONS

The present application claims the benefit of U.S. Provisional Patent Application No. 61/474,193 filed Apr. 11, 2011, which is herein incorporated by reference.

FIELD OF INVENTION

The present invention relates generally to data interfaces and, more particularly, to the charging of a mobile device using high-speed data interfaces.

SUMMARY

Systems and methods for charging a mobile device using a high-speed data interface are described. Power may be provided from Transition Minimized Differential Signaling (TMDS) lines when TMDS data is transmitted via a High-Definition Multimedia Interface (HDMI) connection between a transmitter, such as a mobile device, and a receiving device. Power may be provided to the mobile device in exemplary embodiments such that when the transmitter is in an idle or power down state, power may be provided from TMDS lines as part of an upstream charging function.

DETAILED DESCRIPTION

Figure 1:
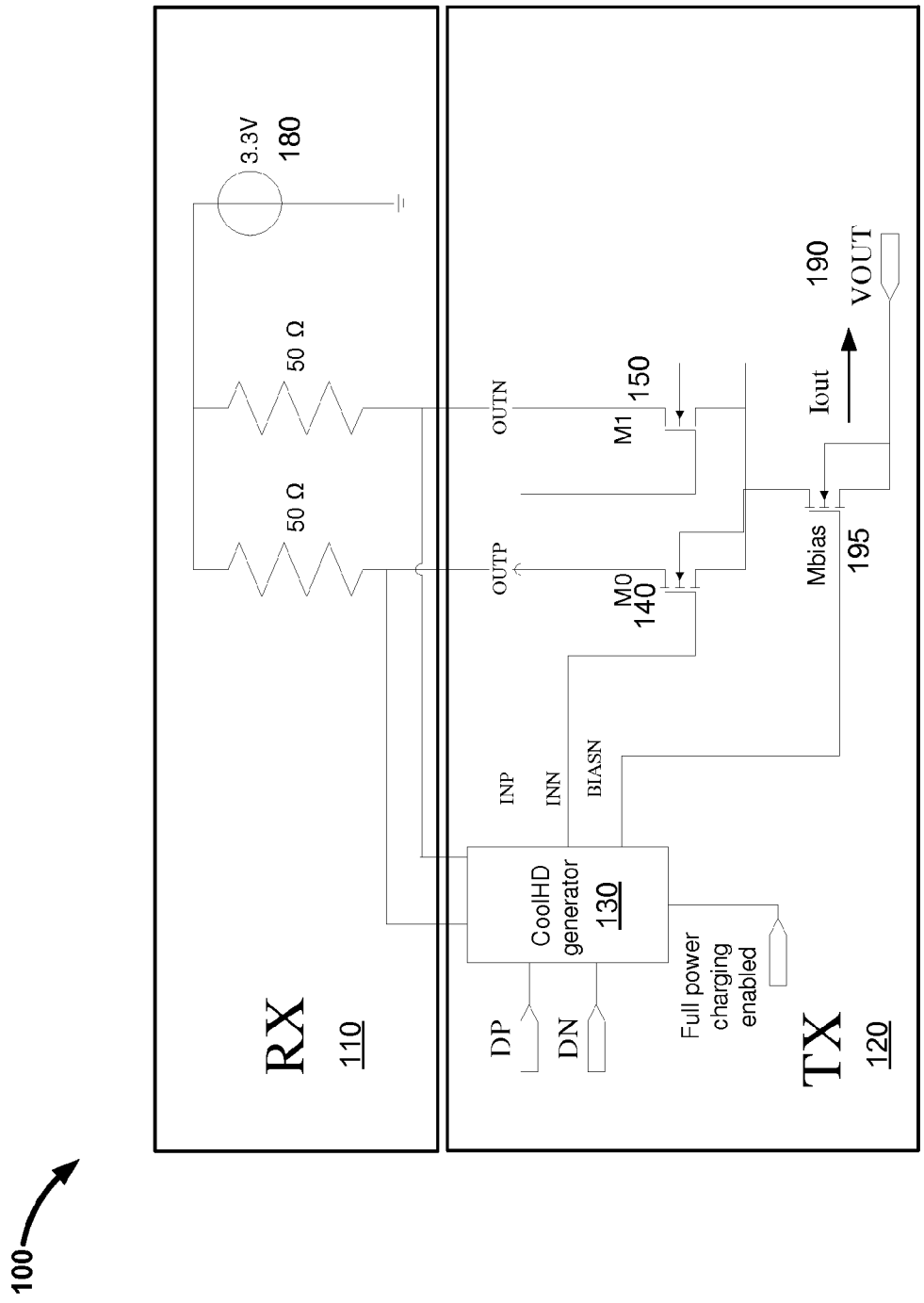
FIG. 1 is a block diagram of an exemplary HDMI interface that provides power to a mobile device.

FIG. 1 is a block diagram of an exemplary high definition multi-media interface (HDMI) 100 that provides power to a mobile device. A first device may have a transmitter TX 120, which may have a first connector, and a battery coupled to an output voltage VOUT 190. A second device may have a receiver, the receiver including terminator RX 110, which may have a second connector.

In a conventional HDMI interface, DC coupling may be used, and a far-end terminator is biased to 3.3V. In such a configuration, the differential signal swing is only 1 Vpp and the lowest voltage level of the single-ended signal is 2.7V, according to the HDMI V1.4 specification. As shown in FIG. 1, considering the Vds of M0 140 and M1 150, and Mbias 195, VOUT 190 has at least 2.1V. In a conventional open drain HDMI transmitter (TX) design, the power VOUT*Iout is not utilized and typically wasted. In the embodiment shown in FIG. 1, the VOUT*Iout power may be recycled and reused. The present technology may utilize a patterned CoolHD generator 130, for example as developed by Analogix Semiconductor, Inc., of Santa Clara, CA, to generate control of INP, INN and BIASN. The CoolHD generator 130 may also be powered by TMDS lines.

In a conventional HDMI idle or power down period, the TDMS output may be kept in a high-Z state. During the idle or power down period, no current is flowing through the receiver (RX) terminator in conventional HDMI systems.

However, the embodiment shown in FIG. 1 uses the idle and/or power down period for upstream battery charging of the mobile device TX 120 when the downstream device (terminator) RX 110 can keep a terminator ON during an idle state and/or a power down period.

Hence, there are two charging methods by different HDMI sinks. One is when the terminator RX 110 is always ON, even if no data is transmitted on the TMDS lines. Another is when the terminator RX 110 will be OFF when no data is transmitted on the TMDS lines.

A low power charging state may be implemented when the sink terminator RX 110 shuts down a 3.3V source 180 when no data is on TMDS lines. For this type of sink, to receive power from the RX terminator side 110, the exemplary system of FIG. 1 may allow a proprietary cable between the mobile device and downstream device to transmit video data (which may be done, for example, by using a CoolHD transmitter). By transmitting video data, the mobile device TX 120 may cause the 3.3V source 180 to be reactivated, thereby supplying power via the terminator RX 110. To draw more power from VOUT 190 for battery charging, the power consumption of TX 120 may be minimized in some embodiments. In this configuration, unused blocks may be powered down, and a lowest supported TDMS clock frequency may be used.

In the low power charging state, the maximal Iout may be about 60 mA. The power consumption of each line of TX 120 may be 8 mA: BGR 1 mA, TX_PLL 1 mA, TX_serdes 4 mA, Crystal OSC 1 mA and P5V 1 mA. Hence, the total power consumption for battery charging may be about 52 mA*2.1V=110 mW.

Figure 2:
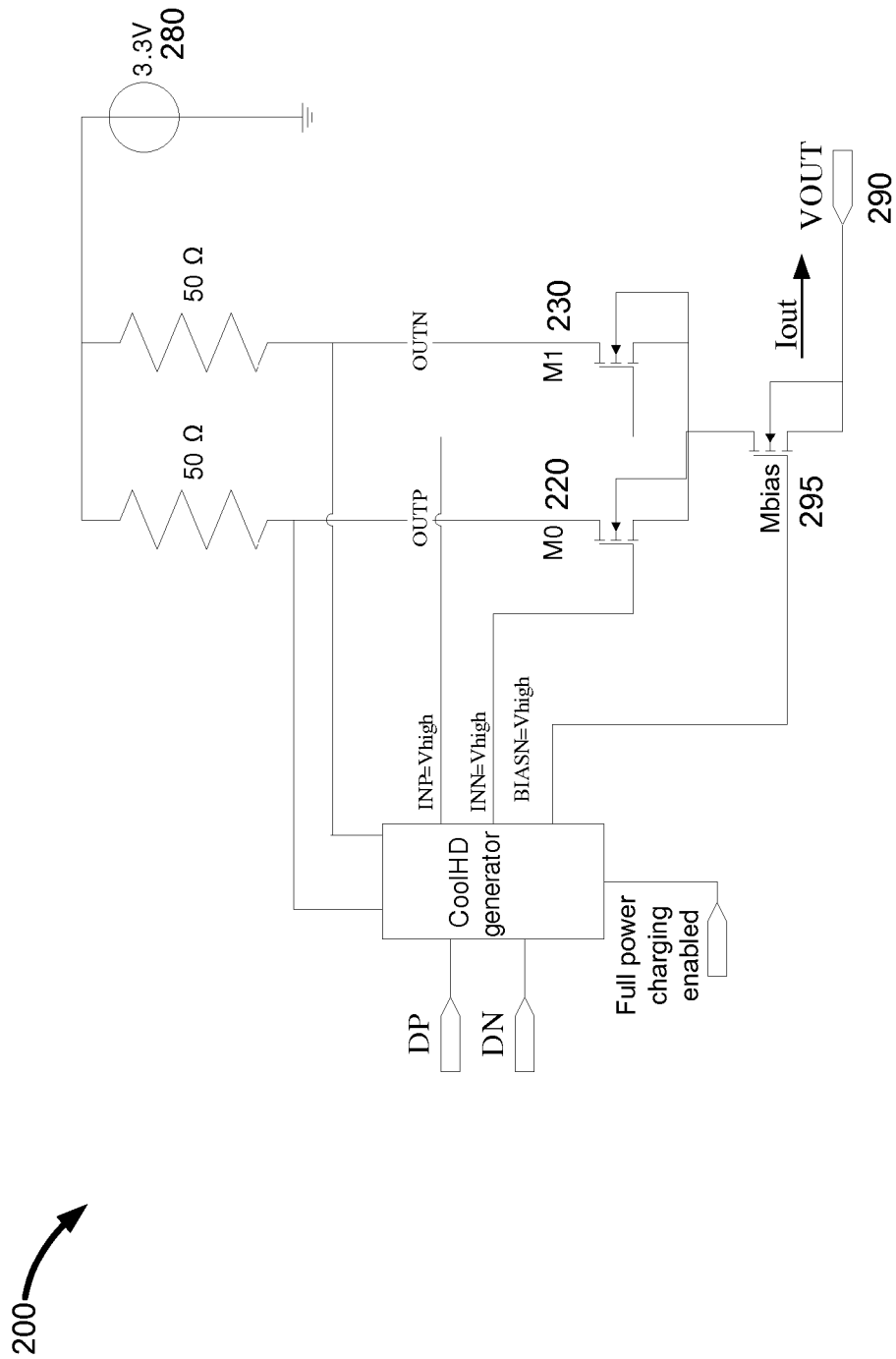
FIG. 2 is a block diagram of an exemplary transmit system block diagram.

FIG. 2 is a block diagram of an exemplary transmit system 200. Full power charging may occur when the sink device RX 110 does not shut down the 3.3V source 280 when there is no data on the TDMS lines. Under full power charging mode, to deliver maximal power to VOUT 290, the exemplary transmit system 200 may connect the INP, INN and BIASN lines to Vhigh (e.g. 3.6V), to minimize the on-resistor of M0 220, M1 230, and Mbias 295.

The output impedance of VOUT 290 may be Rout=25+Rm0/2+Rmbias in some embodiments. Here, Rm0 and Rmbias are the impedance of M0 220 and Mbias 295 respectively. In such an embodiment, output power may be expressed as Pout=VOUT*Iout, wherein VOUT=3.3−Iout*Rout.

Accordingly, ∂Pout/∂I=3.3−2Iout*Rout. If ∂Pout/∂I=0, then Iout*Rout=1.65V. and Pout=1.65^2/Rout. When Rm0=0 and Rmbias=0, the maximal power in this particular exemplary configuration may be expressed as 4*Pout=435.6 mW.

Figure 3:
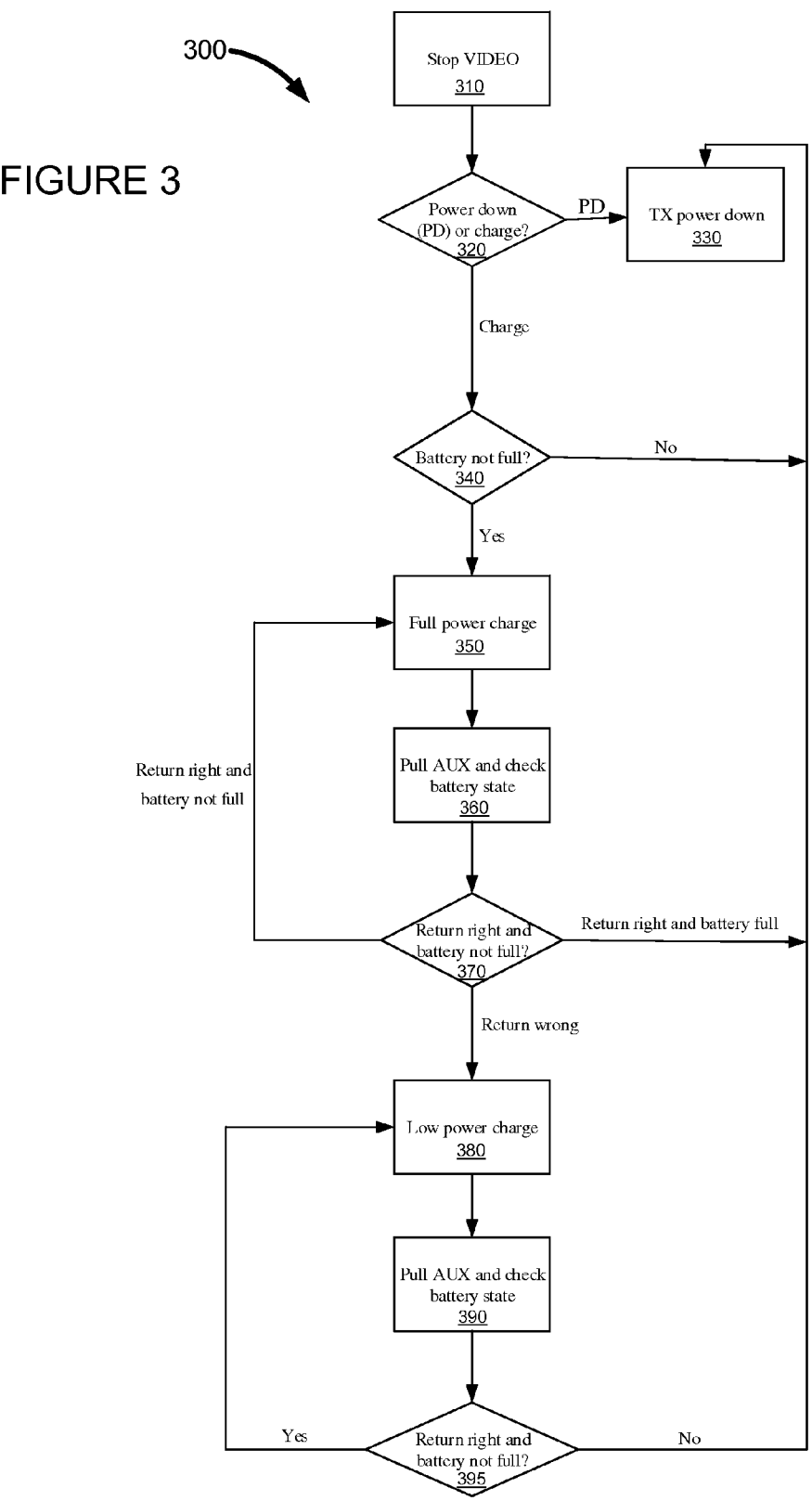
FIG. 3 is a method for an exemplary charging state machine.

The present technology may be operated in a work mode detection and perform switching. FIG. 3 is a method 300 for an exemplary charging state machine. There may be a plurality of work modes for the present technology, including Normal, Power Down, Low Power Charging and Full Power charging. In Normal mode, when video data may be transmitted on TDMS lines, the maximal power may be 21 mW. In Low Power charging mode, the maximal power may be 110 mW, which may be used for charging. In Full Power charging mode, the maximal power may be 435.6 mW, which may be used for charging.

At step 310, video data may cease to be transmitted on the TDMS lines. At step 320, an input may be received (e.g., from the user, or from some internal logic circuitry) indicating whether to power down (PD) the mobile device TX 120, or to charge the mobile device TX 120. If the input indicates for the mobile device TX 120 to power down, then the mobile device TX 120 is powered down at step 330.

If the input indicates for the mobile device TX 120 to charge, then a battery state determination is made at step 340 as to whether the battery of the mobile device is not full. If the determination is no (i.e., the battery is full), then the mobile device TX 120 is powered down at step 330. However, if the battery state determination is that the battery is not full, then the full power charging state described above is entered at step 350. If the 3.3V source 180 is available, then full power charging may take place at step 350. Conversely, if the 3.3V source 180 is unavailable, then battery charging may not take place.

At step 360, an auxiliary coupling (AUX) (e.g., an HDMI cable, or a proprietary media interface cable coupled between the RX and TX), may be interrupted or pulled and the battery state of the mobile device may be checked. Step 360 may take place after a predetermined period of time in some embodiments. The auxiliary coupling may be restored some time after the check of the battery state. At step 370, a power source determination is made, determining if there is access to the 3.3V source 180 (right) or not (wrong). Additionally, at step 370 a second battery state determination is made to determine if the battery of the mobile device is not full. If the determination is no (i.e., the battery is full) and there is access to the 3.3V source 180, then the mobile device TX 120 is powered down at step 330 and the auxiliary coupling may remain interrupted. If the determination is that the battery is not full and there is access to the 3.3V source 180, then the full power charging state described above is reentered at step 350.

If there is no access to the 3.3V source 180, then the low power charging state described above is entered at step 380. At step 390, the AUX coupling may be interrupted or pulled a second time, and the battery state of the mobile device may be checked again. The auxiliary coupling may be restored some time after the check of the battery state. Step 390 may take place after a second predetermined period of time in some embodiments.

At step 395, a second power source determination is made, determining if there is access to the 3.3V source 180 during the low power charging state (right) or not (wrong). Additionally, at step 395, a third battery state determination is made to determine if the battery of the mobile device is not full. If the determination is no (i.e., the battery is full) and there is access to the 3.3V source 180, or if there is no access to the 3.3V source 180, then the mobile device TX 120 may be powered down at step 330 and the auxiliary coupling may remain interrupted. If the determination is that the battery is not full and there is access to the 3.3V source 180 during the low power charging state, then the low power charging state described above is reentered at step 380.

Figure 4:
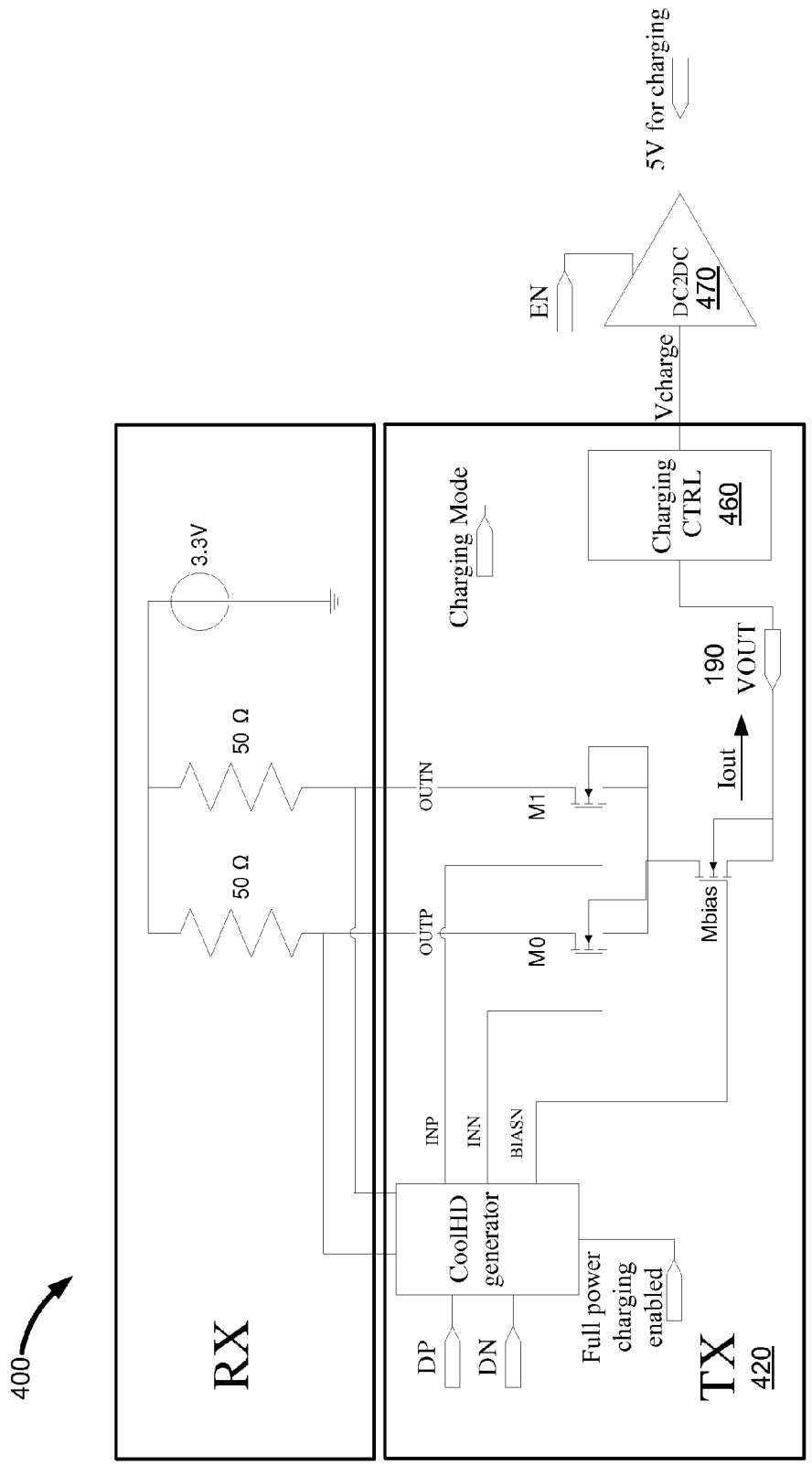
FIG. 4 is a block diagram of an exemplary charging circuit.

FIG. 4 is a block diagram of an exemplary charging circuit 400. As shown in FIG. 4, a charging CTRL circuit 460 may be in communication with a transmit circuit TX 420 to control a charging function. The CTRL circuit 460 may be incorporated within the transmit circuit TX 420 or outside the transmit circuit TX 420 to control the charging. Under a full power charging mode, the CTRL circuit 460 may connect VOUT 190 to Vcharge through a resistor, which in some embodiments may have a relatively small value. Under a low power charging mode, the CTRL circuit 460 may control output voltage Vcharge to make the DC2DC 470 not over load the transmit circuit TX 420 block. This can help ensure that the transmit circuit TX 420 system can work well regardless of the capability of the DC2DC 470. Under a normal mode, Vcharge may be disconnected from VOUT 190.

The present technology may include circuitry and components for performing the functionality described herein, including connectors, data link mechanisms such as wires that communicate data between two or more connectors, and other components. The present technology may be performed by one or more processors which execute instructions stored in memory, the executed instructions causing one or more processors to perform the functions discussed herein.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art.

The scope of the invention should, therefore, be determined not with reference to the above description, but instead should be determined with reference to the appended claims along with their full scope of equivalents.

What is claimed is:

1. A method for charging a battery of a mobile device using a communications interface, the method comprising:
   determining via control circuitry if the mobile device has access to a downstream power supply;
   in response to the mobile device not having access to the downstream power supply:
   transmitting video data via the communications interface, the transmitting the video data causing the mobile device to have access to the downstream power supply;
   receiving power from the downstream power supply at a first rate; and
   charging the battery of the mobile device using the received power.

2. The method of claim 1, the communications interface being a high definition multi-media (HDMI) interface.

3. The method of claim 1, the transmitting of the video data taking place in response to a determination that the mobile device is not sending data via a data line to a receiver coupled to the downstream power supply.

4. The method of claim 1, the transmitting of the video data further comprising powering down transmitter blocks to reduce a transmitter power consumption.

5. The method of claim 1, the transmitting of the video data further comprising using a reduced transmitter clock frequency to transmit the video data relative to a normal operation mode.

6. The method of claim 1, further comprising, when the mobile device has access to the downstream power supply:
   receiving power from the downstream power supply at a second rate that is different from the first rate; and
   charging the battery of the mobile device using the received power.

7. The method of claim 1, further comprising:
   when the mobile device is not sending data via a data line to a receiver coupled to the downstream power supply and the mobile device has access to the downstream power supply, entering a full-power charging mode; and
   when the mobile device is sending data via a data line to a receiver coupled to the downstream power supply and the mobile device has access to the downstream power supply, entering a normal charging mode, the full-power charging mode receiving power at a higher rate than the normal charging mode.

8. A system for charging a battery of a mobile device using a communications interface, the system comprising:
- control circuitry configured to determine if the mobile device has access to a downstream power supply;
- transmitter circuitry coupled to the control circuitry, the transmitter circuitry being configured, in response to an indicator received from the control circuitry that the mobile device does not have access to the downstream power supply, to transmit video data through the communications interface, the transmitting the video data causing the mobile device to have access to the downstream power supply; and
- charging circuitry coupled to the control circuitry, the control circuitry causing the mobile device to receive power from the downstream power supply at a first rate, the charging circuitry providing the received power to the battery of the mobile device.

9. The system of claim 8, the communications interface being a high definition multi-media (HDMI) interface.

10. The system of claim 9, the transmitter circuitry transmitting the video data in response to a determination made by the control circuitry that the mobile device is not sending data via a data line to a receiver coupled to the downstream power supply.

11. The system of claim 9, the control circuitry being further configured to power down transmitter blocks to reduce a transmitter power consumption when the indicator is received from the control circuitry.

12. The system of claim 9, the control circuitry being further configured to cause the transmitter circuitry to transmit the video data at a reduced transmitter clock frequency relative to a normal operation mode in response to the indicator being received from the control circuitry.

13. The system of claim 9, the control circuitry being further configured, when the mobile device has access to the downstream power supply, to cause the mobile device to receive power from the downstream power supply at second rate that is different from the first rate, the charging circuitry providing the received power to the battery of the mobile device.

14. The system of claim 9, the control circuitry being further configured to:
- when the mobile device is not sending data via a data line to a receiver coupled to the downstream power supply and the mobile device does have access to the downstream power supply, cause the mobile device to enter a full-power charging mode; and
- when the mobile device is sending data via a data line to a receiver coupled to the downstream power supply and the mobile device has access to the downstream power supply, cause the mobile device to enter a normal charging mode, the full-power charging mode receiving power at a higher rate than the normal charging mode.

15. A method for charging a battery of a mobile device using a communications interface, the method comprising:
- receiving an input from the mobile device indicating for the mobile device to charge;
- charging the mobile device in response to the received input using a full-power charging state when a downstream power supply is available;
- interrupting a coupling between the mobile device and the communications interface;
- determining via control circuitry if the mobile device has access to the downstream power supply and determining a charge state of the battery;
- restoring the coupling between the mobile device and the communications interface when the control circuitry determines to further charge the battery;
- in response to the mobile device not having access to the downstream power supply:
  - transmitting video data via the communications interface, the transmitting the video data causing the mobile device to have access to the downstream power supply;
  - receiving power from the downstream power supply at a first rate; and
  - charging the battery of the mobile device using the received power.

16. The method of claim 15, wherein the interrupting the coupling takes place in response to the end of a predetermined period of time.

17. The method of claim 15, further comprising:
- interrupting a coupling between the mobile device and the communications interface a second time after charging the battery of the mobile device using the received power;
- determining via the control circuitry if the mobile device has access to the downstream power supply and determining a second charge state of the battery; and
- when the control circuitry determines to further charge the battery:
  - restoring the coupling between the mobile device and the communications interface a second time;
  - re-transmitting video data via the communications interface, the transmitting the video data causing the mobile device to have access to the downstream power supply;
  - receiving power from the downstream power supply at the first rate; and
  - charging the battery of the mobile device using the received power a second time.

18. The method of claim 15, the transmitting of the video data causing the mobile device to have access to the downstream power supply further comprising re-activating the downstream power supply at a receiver, and causing power to be available to the mobile device via terminating resistors of the receiver.

19. The method of claim 15, further comprising controlling the charging the battery of the mobile device using the received power via the control circuitry to prevent overloading of a transmit circuit block.

* * * * *